United States Patent [19]

Takeuchi et al.

[11] Patent Number: 4,646,892
[45] Date of Patent: Mar. 3, 1987

[54] CLUTCH COVER ASSEMBLY

[75] Inventors: Hiroshi Takeuchi, Osaka; Hidekazu Majima, Yawata; Hirotaka Fukushima, Hirakata, all of Japan

[73] Assignee: Kabushiki Kaisha Daikin Seisakusho, Osaka, Japan

[21] Appl. No.: 641,466

[22] Filed: Aug. 16, 1984

[30] Foreign Application Priority Data

Aug. 17, 1983 [JP] Japan ................................ 58-150651

[51] Int. Cl.⁴ ............................................. F16D 13/71
[52] U.S. Cl. .................................. 192/70.27; 192/89 B
[58] Field of Search ............... 192/70.18, 70.27, 70.28, 192/89 B; 403/348, 349, 350

[56] References Cited

U.S. PATENT DOCUMENTS

| | | | |
|---|---|---|---|
| 1,631,235 | 6/1927 | Trumble | 192/70.27 X |
| 2,047,737 | 7/1936 | Lane | 192/70.27 |
| 2,229,319 | 1/1941 | Wesselhoff | 192/70.28 X |
| 2,232,848 | 2/1941 | Geyer | 192/70.27 |
| 2,399,886 | 5/1946 | Odevseff | 192/70.27 X |
| 3,104,746 | 9/1963 | Gadd et al. | 192/89 B X |
| 3,306,407 | 2/1967 | Smirl | 192/89 B X |

FOREIGN PATENT DOCUMENTS 2075618  11/1981  United Kingdom ............. 192/70.18

Primary Examiner—Rodney H. Bonck
Assistant Examiner—Richard M. Lorence
Attorney, Agent, or Firm—Burns, Doane, Swecker and Mathis

[57] ABSTRACT

A clutch cover assembly includes a disphragm spring integrally formed with a clutch cover; a release mechanism for applying a force in a clutch releasing direction to the radially inner portion of the diaphragm spring; a pressure plate of which rear surface is connected to the radially middle portion of the diaphragm spring; and a flywheel to which the outer peripheral portion of the diaphragm spring is hooked from the side of the pressure plate. The flywheel is provided with a cylindrical portion projecting to the rear around the pressure plate, and the outer peripheral portion of the spring is hooked to a stopper ring fixed to the inner periphery of the cylindrical portion of the flywheel.

3 Claims, 12 Drawing Figures

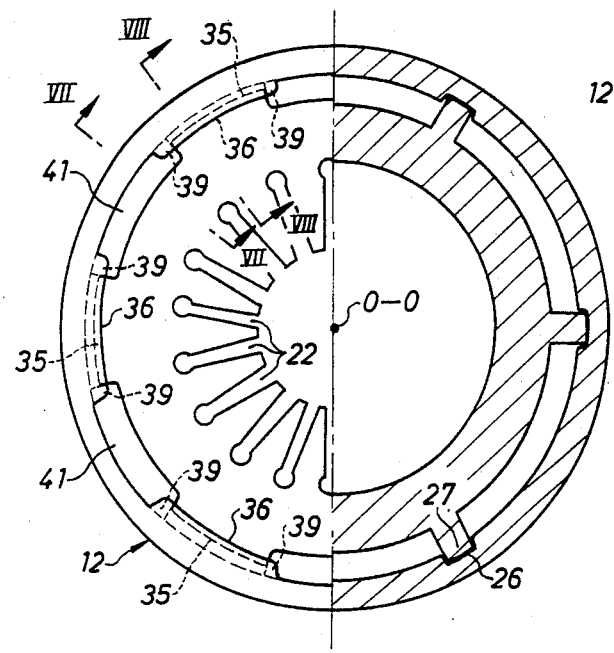
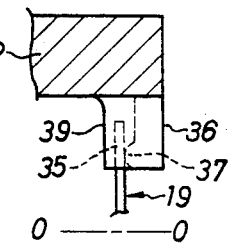
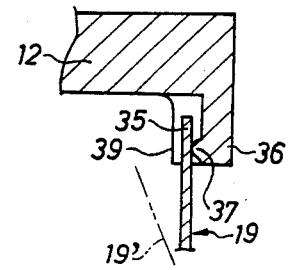
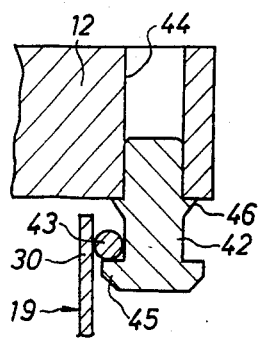
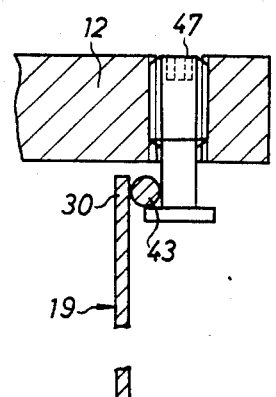
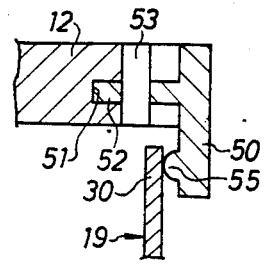
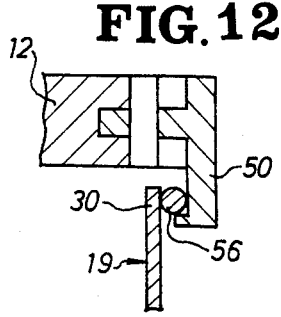

4,646,892

CLUTCH COVER ASSEMBLY

BACKGROUND AND SUMMARY OF THE INVENTION

The present invention relates to a clutch cover assembly for a friction clutch, and particularly, to a clutch cover assembly including a diaphragm spring for forcing a pressure plate toward a clutch disc.

As shown in FIG. 1, a known clutch cover assembly includes a clutch cover 1 and a diaphragm spring 2 which are independent to each other. The diaphragm spring 2 is carried by a clutch cover 1 through a fulcrum means consisting of wire rings 3 and others. Therefore, the known assembly has such disadvantages that it requires many parts, the cost is high and the weight and the space are large. Further, wear of the wire rings 3 and the others reduces accuracy in an engaging operation of the clutch, and thus, causes an insufficient disengagement of the clutch.

Accordingly, it is an object of the invention to provide an improved clutch disc assembly, overcoming the above noted disadvantages.

The essence of the invention is to provide a diaphragm spring integrally formed with a clutch cover. The radially inner portion of the spring is connected to a release mechanism for applying a force in a clutch releasing direction to the spring. The radially middle portion of the spring is connected to a rear surface of a pressure plate. The radially outer portion of the spring is hooked to a flywheel from the pressure plate side.

According to the above structure, the diaphragm spring is prevented from receiving an excessively strong force.

Other and further objects, features and advantages of the invention will appear more fully from the following description of the preferred embodiments of the invention.

BRIEF DESCRIPTION OF THE DRAWINGS

FIG. 6 is a schematic sectional view of the embodiment in FIG. 5;

FIG. 7 is an enlarged sectional partial view taken along line VII—VII in FIG. 6;

FIG. 8 is an enlarged sectional partial view taken along line VIII—VIII in FIG. 6;

FIG. 9 is a sectional partial view of a still another embodiment;

FIG. 10 is a sectional partial view of a still another embodiment;

FIG. 11 is a sectional partial view of a still another embodiment; and

FIG. 12 is a sectional partial view of a still another embodiment.

DETAILED DESCRIPTION OF THE PREFERRED EMBODIMENTS

Figure 2:
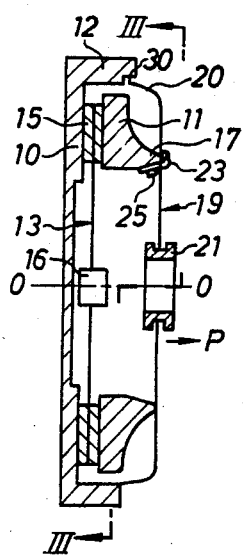
FIG. 2 is a schematic sectional view of a clutch assembly employing an embodiment of the invention.

Referring to FIG. 2, a flywheel 10 is connected to an output shaft of an engine (not shown), and is provided at the radially outer portion with a cylindrical portion 12 extending to the rear around a pressure plate 11. A clutch disc 13 is provided at the outer periphery with an annular facing 15 and is provided at the inner periphery with a hub 16 splined to an output shaft, of which center is indicated by a line O—O. The facing 15 is positioned between the flywheel 10 and the pressure plate 11. The pressure plate is designed to press the facing 15 against the flywheel 10 to transmit a torque of the engine from the flywheel 10 through the disc 13 to the output shaft, and thus, to engage the clutch.

The pressure plate 11 is provided at a radially inner portion of the rear surface (the surface opposite to the facing 15) with an annular projection 17. A disphragm spring 19 is disposed at the rear side of the pressure plate 11. In the illustrated engaged condition of the clutch, the spring 19 is substantially perpendicular to the center O—O of the output shaft. The spring 19 is provided at the outer periphery with a cylindrical portion 20 curved toward the flywheel 10. An outer periphery 30 of the cylindrical portion 20 is hooked to the inner periphery of the end of the cylindrical portion 12 of the flywheel 10 as will be detailed later. A clutch cover is formed by the cylindrical portion 20 as well as a portion continuing to the portion 20 and covering the rear side of the plate 11. Namely, the clutch cover is integrally formed with the diaphragm spring 19. The inner periphery of the diaphragm spring 19 is connected to a release mechanism 21 connected to an operation mechanism of the clutch. When the mechanism is operated, the release mechanism 21 moves the inner periphery of the spring 19 in a direction shown by an arrow P to move the spring 19 away from the disc 13.

Figure 3:
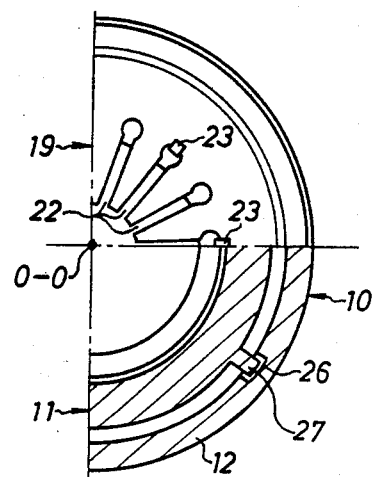
FIG. 3 is a schematic sectional partial view of the assembly taken along line III—III in FIG. 2.

As shown in FIG. 3, the spring 19 is provided with radiated slits 22 or slots respectively extending from the inner periphery of the spring 19 to the radially middle portion thereof. Clips 23 are entered in the radially outer ends of some of the slits 22. As shown in FIG. 2, the base ends of the clips 23 is fixed to the inner periphery of the projection 17 of the pressure plate 11 by screws 25 or the like. Other ends of the clips 23 contact the diaphragm spring 19 from the side opposite to the pressure plate 11. By the clips 23, the radially middle portions of the spring 19 is in contact with and fixed to the end of the projection 17.

As shown in FIG. 3, the cylindrical portion 12 of the flywheel 10 is provided at the inner periphery of the portion 12 with circumferentially spaced grooves 26 or recesses extending parallel to the center O—O of the output shaft. The pressure plate 11 is provided at the outer periphery with projections 27. The projections 27 are slidably fitted into the grooves 26 in the axial direction parallel to the center O—O of the output shaft, respectively. Whereby, the pressure plate 11 rotates together with the flywheel 10 and is slidable with respect to the flywheel 10 in the axial direction.

Figure 4:
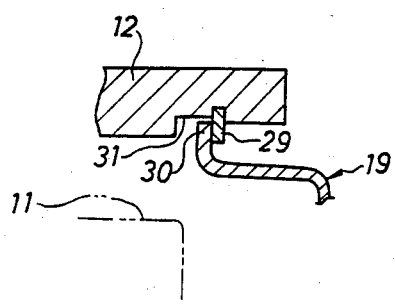
FIG. 4 is an enlarged partial view of FIG. 2.

As shown in FIG. 4, a stopper ring 29 like a snap ring is fixed to the inner periphery of the end of the cylindrical portion 12. The outer peripheral portion 30 of the spring 19 is hooked to the stopper ring 29 from the side of the pressure plate 11. At the rear of the peripheral portion 30, an annular groove 31 is formed at the inner periphery of the cylindrical portion 12.

An operation is as follows. In the condition illustrated in FIG. 2, the spring 19 is in a substantially flat shape to force the pressure plate 11 toward the flywheel 10, and thus the clutch is engaged. When the release mechanism 21 pulls the radially inner end of the spring 19 in the direction shown by the arrow P, the spring 19 deforms into a tapered shape to pull the pressure plate 11 away from the facing 15, and thus, the clutch is disengaged. In this disengaging operation, the spring 19 deforms and the outer peripheral portion 30 operates as a fulcrum. However, the portion 30 is not rigidly fixed but hooked to the stopper ring 29 in a linear contact condition. Therefore, any excessively strong force is not applied to the portion 30 and the rear thereof. Of course, when the clutch returns to the engaging operation from the disengaged condition, any excessively strong force is not applied to the portion 30.

Figure 1:
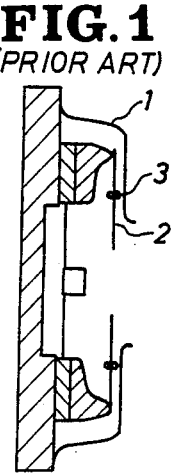
FIG. 1 is a schematic sectional view of a known clutch disc assembly.

According to the invention, as stated hereinbefore, the diaphragm spring 19 is integral to the clutch cover. Therefore, the number of the parts can be reduced, which results in a low manufacturing cost. Further, the weight and the space can be small. Moreover, in comparison with the conventional structure including the wire ring in FIG. 1, the fulcrum has a simple construction, and thus, an insufficient operation by the wear can be prevented.

Although, it is not the present invention, the outer periphery may be rigidly fixed to the cylindrical portion 12 by the bolts or the like. However, this rigidly fixed strucuture unpreferably increases a radial size of the clutch for fixing the bolts. Further, if the outer periphery of the spring 19 is rigidly fixed, an excessively strong force is applied to the outer peripheral portion of the spring 19 during the engaging and disengaging operation. Especially, the excessively strong force concentrates to the portions fixed by the bolts. Therefore, the outer peripheral portion may break. Moreover, in the rigidly fixed construction, it is necessary to form a plurality of slits or recesses in the outer peripheral portion to reduce the rigidity for easy deformation, which unpreferably reduces the strength of the spring.

In comparison with the above, the outer peripheral portion 30 is hooked, e.g., to the stopper ring 29 according to the invention. Therefore, the size of the clutch can be small at the portion for supporting the outer peripheral portion 30. Further, since the outer peripheral portion 30 can freely turn around the stopper ring 29 through the linear contact portion, any excessively strong force is not applied to the outer peripheral portion 30. Moreover, the substantially full circumference of the outer peripheral portion 30 contacts the stopper ring 29. Therefore, the portion 30 does not receive a partially strong stress. Of course, it is not necessary to form a recess in the portion 30. Therefore, the strength of the portion 30 of the diaphragm spring 19 has a sufficiently large strength.

The invention may be modified as shown in FIGS. 5 to 12.

Figure 5:
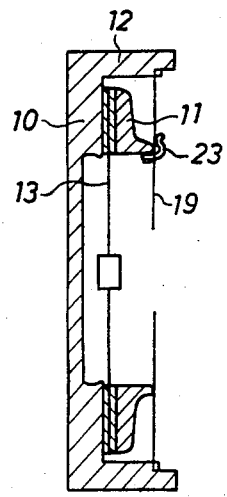
FIG. 5 is a schematic sectional view of a clutch assembly employing another embodiment of the invention.

In an embodiment in FIG. 5, a diaphragm spring 19 has a substantially flat shape as a whole. In other words, the radial section of the spring 19 is linear or straight as a whole.

In an embodiment in FIG. 6, circumferentially and equally spaced tongues 35 are integrally formed at an outer periphery of a diaphragm spring 19. As shown in FIGS. 6–8, protrusions 36 protruding radially inwardly are integrally form at an inner periphery of a cylindrical portion 12 of a flywheel. The tongues 35 are hooked to the protrusions 36, respectively. As shown in FIG. 8, a protrudent support 37 of an arc shape is integrally formed at the radially inner edge of each protrusion 36. The support 37 protrudes toward a pressure plate form the protrusion 36 and extends along the full length of the inner edge of the protrusion 36. The tongues 35 of the spring 19 contact the tops of the supports 37, respectively. As shown in FIG. 6, stoppers 39 are integrally formed at circumferentially both ends of each protrusion 36. As shown in FIG. 7, the stoppers 39 project to the sides of the tongues 35 to prevent the spring 19 from relative turning with respect to the cylindrical portion 12.

The structure in FIG. 6 is assembled as follows. Initially, the spring 19 is deformed into a tapered shape as shown in a phantom line 19' in FIG. 8 by a jig (not shown). The tongues 35 of the tapered spring 19 are moved to the inside of the portion 12 through spaces between the protrusions 36, and then, the spring 19 is turned so that the tongues 35 face the protrusions 36. In this position, the jig is removed to hook the tongues 35 to the protrusions 36, and thus the spring 19 is assembled to the cylindrical portion 12.

In an embodiment in FIG. 9, radially inwardly directed supports or pins 42 and a wire ring 43 are substituted for the stopper ring 29 in FIG. 4. The pins 42 are knocked into ports 44 formed in a cylindrical portion 12. The wire ring 43 supports an outer peripheral portion 30 of a diaphragm spring 19 from the side opposite to a pressure plate. The pins 42 support the wire ring 43 from the opposite side to the spring 19. The pins 42 are provided at the ends with flanges 45 for supporting the inner periphery of the ring 43. The pins 42 are also provided at the middle portions with flanges 46 seated on the inner peripheral surface of the cylindrical portion 12 around the port 44. A centrifugal force generated by the rotation of the clutch is applied to the pins 42, so that the flanges 46 are pressed to the portion 12. Therefore, the pins 42 do not disengage from the portion 12.

Instead of the pins 42 in FIG. 9, as shown in FIG. 10, hexagon socket screws 47 or slotted screws may be used.

As shown in FIG. 11, an annular fulcrum ring 50 may be employed. The ring 50 is fixed to an annular end surface of a cylindrical portion 12. More concretely, projections 52 formed on the ring 50 are fitted into recesses formed at the end surface of the portion 12 and are fixed thereto by radial knock-pins 53. The ring 50 projects radially inwardly beyond the cylindrical portion 12. The ring 50 is provided at the inwardly projected portion with an integrally protruded support 55 which supports the diaphragm spring 19.

The integral support 55 in FIG. 11 may be substituted for a wire ring 56 in FIG. 12.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A clutch cover assembly comprising a diaphragm spring integrally formed with a clutch cover having a radially inner portion, a radially middle portion, and an outer peripheral portion; a release mechanism for applying a force in a clutch releasing direction to the radially inner portion of the diaphragm spring; a pressure plate having a surface connected to the radially middle portion of the diaphragm spring; a flywheel to which the outer peripheral portion of the diaphragm spring is hooked from a side adjacent to the pressure plate; wherein said flywheel is provided with a cylindrical portion projecting to the rear around the pressure plate; wherein radially inwardly projecting supports are fixed to the cylindrical portion, and wherein the outer peripheral portion of the spring is hooked to the supports from the side of the pressure plate wherein a wire ring is provided for the spring to bear against; wherein the radially inwardly projecting supports are pins having a first flange; the first flange of each pin cooperating to support the wire ring.

2. The clutch cover assembly of claim 1 wherein each pin includes a second flange; wherein the second flange is seated against the cylindrical portion of the flywheel; and wherein centrifugal force operates to hold the pins against the cylindrical portion of the flywheel.

3. The clutch cover assembly of claim 1 wherein each pin has a threaded portion which cooperates with a correspondingly threaded bore in the cylindrical portion of the flywheel.

* * * * *